(12) United States Patent
Zou et al.

(10) Patent No.: US 12,158,646 B2
(45) Date of Patent: Dec. 3, 2024

(54) DISPLAY PANEL, DISPLAY MODULE, AND DISPLAY DEVICE

(71) Applicant: Huizhou China Star Optoelectronics Display Co., Ltd., Guangdong (CN)

(72) Inventors: Guangnan Zou, Guangdong (CN); Weiwei Zheng, Guangdong (CN); Zhuping Luo, Guangdong (CN); Zi Wang, Guangdong (CN)

(73) Assignee: Huizhou China Star Optoelectronics Display Co., Ltd., Huizhou (CN)

( * ) Notice: Subject to any disclaimer, the term of this patent is extended or adjusted under 35 U.S.C. 154(b) by 0 days.

(21) Appl. No.: 17/419,766

(22) PCT Filed: Jun. 21, 2021

(86) PCT No.: PCT/CN2021/101262
§ 371 (c)(1),
(2) Date: Dec. 15, 2022

(87) PCT Pub. No.: WO2022/257179
PCT Pub. Date: Dec. 15, 2022

(65) Prior Publication Data
US 2024/0012274 A1    Jan. 11, 2024

(30) Foreign Application Priority Data
Jun. 7, 2021 (CN) .......................... 202110630926.9

(51) Int. Cl.
*G02F 1/1333* (2006.01)
*G02F 1/1335* (2006.01)
*G02F 1/1362* (2006.01)

(52) U.S. Cl.
CPC .. *G02F 1/133317* (2021.01); *G02F 1/133512* (2013.01); *G02F 1/133528* (2013.01); *G02F 1/136209* (2013.01); *G02F 2202/28* (2013.01)

(58) Field of Classification Search
CPC ......... G02F 1/133317; G02F 1/133528; G02F 1/133322; G02F 2202/28; G02F 1/136218; G02F 1/136209
See application file for complete search history.

(56) References Cited

U.S. PATENT DOCUMENTS 6,147,724 A      11/2000  Yoshii et al.
2015/0373865 A1* 12/2015  Byeon ................. H05K 5/0217
                                              361/679.01
(Continued)

FOREIGN PATENT DOCUMENTS

CN     205103517       3/2016
CN     106526954       3/2017
(Continued)

*Primary Examiner* — Jia X Pan

(57) ABSTRACT

The present application discloses a display panel, a display module, and a display device. The display panel includes a first substrate and a second substrate disposed opposite to each other, and the first substrate includes a metal wiring located in a non-display area; wherein the first substrate includes a black shielding layer, and by providing the black shielding layer in the display panel, wherein the black shielding layer covers the metal wiring in an orthographic projection direction of the first substrate, appearance effect of the display panel is thereby improved.

20 Claims, 3 Drawing Sheets

(56) References Cited

U.S. PATENT DOCUMENTS

| | | | |
|---|---|---|---|
| 2016/0116787 A1 | 4/2016 | Kim | |
| 2019/0011789 A1* | 1/2019 | Chen | ............... G02F 1/133528 |
| 2019/0377221 A1* | 12/2019 | Baek | ............... G02F 1/133308 |
| 2020/0096808 A1* | 3/2020 | Xu | ................. G02F 1/133308 |

FOREIGN PATENT DOCUMENTS

| | | | | |
|---|---|---|---|---|
| CN | 106526954 A | * | 3/2017 | ....... G02F 1/133514 |
| CN | 106684100 | | 5/2017 | |
| CN | 106707598 | | 5/2017 | |
| CN | 108153071 | | 6/2018 | |
| CN | 207457653 | | 6/2018 | |
| CN | 209496220 | | 10/2019 | |
| CN | 110850625 | | 2/2020 | |

\* cited by examiner preparing a display panel. — S10 preparing a first polarizer on the side of the first substrate away from the second substrate, and preparing a second polarizer on a side of the second substrate away from the first substrate. — S20 preparing a side sealant at a side of the display panel. — S30 assembling the backlight module, the black frame, and the middle frame. — S40 assembling the display panel, the backlight module, the black frame, and the middle frame. — S50

FIG. 5

DISPLAY PANEL, DISPLAY MODULE, AND DISPLAY DEVICE

RELATED APPLICATIONS

This application is a National Phase of PCT Patent Application No. PCT/CN2021/101262 having International filing date of Jun. 21, 2021, which claims the benefit of priority of Chinese Patent Application No. 202110630926.9 filed on Jun. 7, 2021. The contents of the above applications are all incorporated by reference as if fully set forth herein in their entirety.

FIELD AND BACKGROUND OF THE INVENTION

The present application relates to the field of display, and in particular to a display panel, a display module, and a display device.

At present, popularity of full-screen mobile phones is getting higher and higher, and screens with high screen-to-body ratios are becoming more and more popular. Therefore, regardless of TV, mobile phone, or display screen, manufacturers' requirements for frames are gradually increasing, and display devices have gradually updated iteratively from original four-frame covered display devices to three-sided borderless display devices, until four-sided borderless display devices appeared in recent years.

In existing designs, a filling material is usually added to a gap between a color filter substrate and an array substrate to achieve the four-sided borderless display device. However, such means has defects such as chromatic aberration between a filled area and a non-filled area, an uneven light-exiting surface of the display panel, and a poor appearance of the four-sided borderless display device.

SUMMARY OF THE INVENTION

The present application provides a display panel, a display module, and a display device to effectively improve an appearance effect of the display panel.

In order to solve the above problems, technical solutions provided by the present application are as follows:

A display panel, including:
a first substrate and a second substrate arranged opposite to each other, and a liquid crystal layer sandwiched between the first substrate and the second substrate,
wherein the display panel includes a display area and a non-display area adjacent to the display area, and the first substrate includes a metal wiring located in the non-display area; and
wherein the first substrate includes a black shielding layer, and the black shielding layer covers the metal wiring in an orthographic projection direction of the first substrate.

In the display panel provided by the present application, the black shielding layer is located on a side of the first substrate away from the second substrate.

In the display panel provided by the present application, the black shielding layer is located in the non-display area, and a distance from a side of the black shielding layer close to the display area to the display area is 0.1 mm to 0.5 mm.

In the display panel provided by the present application, the first substrate includes a base substrate and a wiring layer disposed on a side of the base substrate close to the second substrate, and the wiring layer includes a plurality of metal wirings located in the non-display area; and
wherein the black shielding layer is disposed in the first substrate and located on a side of the wiring layer away from the second substrate.

In the display panel provided by the present application, the black shielding layer is made of black ink.

The present application provides a display module, including any one of the above-mentioned display panels, and a middle frame and a side sealant located in the non-display area of the display panel,
wherein the side sealant is disposed at side surfaces of the black shielding layer, the first substrate, and the second substrate facing the middle frame.

In the display module provided by the present application, the display module further includes a polarizer disposed on a side of the first substrate away from the second substrate;
wherein the polarizer completely covers the first substrate, the black shielding layer, and the side sealant; and
wherein the side sealant is respectively bonded to the display panel and the polarizer, and a bonding width between the side sealant and the polarizer is 0.2 mm to 0.5 mm.

In the display module provided by the present application, the non-display area includes a stepped sub-area located at a side of the display area, and the second substrate includes a hollow portion located in the stepped sub-area;
wherein the display module further includes a black frame located in the non-display area, and the black frame includes a first shielding portion disposed in the hollow portion and a second shielding portion extended from one end of the first shielding portion to the display area; and
wherein the black shielding layer covers the first shielding portion and the second shielding portion in the orthographic projection direction of the first substrate.

In the display module provided by the present application, the second shielding portion is bonded to the second substrate by a first double-sided adhesive; a side of the first double-sided adhesive close to the black frame is flush with a side of the second substrate close to the black frame; and the black shielding layer covers the first double-sided adhesive in the orthographic projection direction of the first substrate.

In the display module provided by the present application, the middle frame includes a first frame and a second frame arranged at a periphery of the display panel;
wherein the first frame is disposed at a first side of the display panel, the second frame is disposed at least at a second side of the display panel, the first side and the second side are opposite sides of the display panel, and the first side is a side of the display panel close to the black frame; and
wherein the second frame includes an extension portion extending to a side of the second substrate away from the first substrate, and the black shielding layer covers the extension portion in the orthographic projection direction of the first substrate.

In the display module provided by the present application, the extension portion is bonded to the second substrate by a second double-sided adhesive; and the black shielding layer on the first substrate covers the second double-sided adhesive in the orthographic projection direction of the first substrate.

The present application provides a display device, including a display module, the display module including a display panel, and the display panel includes:

a first substrate and a second substrate arranged opposite to each other, and a liquid crystal layer sandwiched between the first substrate and the second substrate, wherein the display panel includes a display area and a non-display area adjacent to the display area, and the first substrate includes a metal wiring located in the non-display area;

wherein the first substrate includes a black shielding layer, and the black shielding layer covers the metal wiring in an orthographic projection direction of the first substrate; and wherein the display module further includes a middle frame and a side sealant located in a non-display area of the display panel, and the side sealant is disposed at side surfaces of the black shielding layer, the first substrate, and the second substrate facing the middle frame.

In the display device provided by the present application, the black shielding layer is located on a side of the first substrate away from the second substrate.

In the display device provided by the present application, the black shielding layer is located in the non-display area, and a distance from a side of the black shielding layer close to the display area to the display area is 0.1 mm to 0.5 mm.

In the display device provided by the present application, the first substrate includes a base substrate and a wiring layer disposed on a side of the base substrate close to the second substrate, and the wiring layer includes a plurality of metal wirings located in the non-display area;

wherein the black shielding layer is disposed in the first substrate and located on a side of the wiring layer away from the second substrate.

In the display device provided by the present application, the black shielding layer is made of black ink.

In the display device provided by the present application, the display module further includes a polarizer disposed on a side of the first substrate away from the second substrate;

wherein the polarizer completely covers the first substrate, the black shielding layer, and the side sealant; and wherein the side sealant is respectively bonded to the display panel and the polarizer, and a bonding width between the side sealant and the polarizer is 0.2 mm to 0.5 mm.

In the display device provided by the present application, the non-display area includes a stepped sub-area located at a side of the display area, and the second substrate includes a hollow portion located in the stepped sub-area;

wherein the display module further includes a black frame located in the non-display area, and the black frame includes a first shielding portion disposed in the hollow portion and a second shielding portion extended from one end of the first shielding portion to the display area; and wherein the black shielding layer covers the first shielding portion and the second shielding portion in the orthographic projection direction of the first substrate.

In the display device provided by the present application, the second shielding portion is bonded to the second substrate by a first double-sided adhesive; a side of the first double-sided adhesive close to the black frame is flush with a side of the second substrate close to the black frame, and the black shielding layer covers the first double-sided adhesive in the orthographic projection direction of the first substrate.

In the display device provided by the present application, the middle frame includes a first frame and a second frame arranged at a periphery of the display panel;

wherein the first frame is disposed at a first side of the display panel, the second frame is disposed at least at a second side of the display panel, the first side and the second side are opposite sides of the display panel, and the first side is a side of the display panel close to the black frame; and wherein the second frame includes an extension portion extending to a side of the second substrate away from the first substrate, and the black shielding layer covers the extension portion in the orthographic projection direction of the first substrate.

The display panel provided by the present application includes a first substrate and a second substrate arranged opposite to each other, and a liquid crystal layer sandwiched between the first substrate and the second substrate, wherein the display panel includes a display area and a non-display area adjacent to the display area, and the first substrate includes a metal wiring located in the non-display area; and wherein the first substrate includes a black shielding layer, and the black shielding layer covers the metal wiring in an orthographic projection direction of the first substrate, thereby improving appearance effect of the display panel.

BRIEF DESCRIPTION OF THE SEVERAL VIEWS OF THE DRAWINGS

The technical solutions and other beneficial effects of the present application will be made obvious by describing the specific implementation manners of the present application in detail below in conjunction with the accompanying drawings.

FIG. 5 is a schematic block diagram of a flow chart of a method of manufacturing a display device according to an embodiment of the present application.

DESCRIPTION OF SPECIFIC EMBODIMENTS OF THE INVENTION

In order to make the purpose, technical solution, and effect of the present application clearer and more definite, the present application is further described in detail below with reference to the accompanying drawings and examples. It should be understood that the specific embodiments described herein are only used to explain the present application, and are not used to limit the present application.

Figure 1:
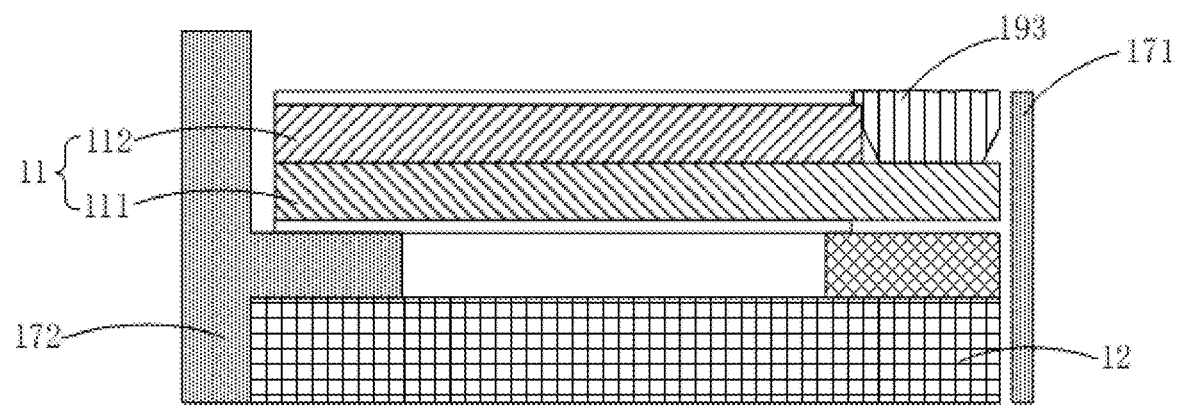
FIG. 1 is a schematic structural diagram of a four-sided borderless display device in the prior art.

Referring to FIG. 1, FIG. 1 is a schematic structural diagram of a four-sided borderless display device in the prior art.

In the prior art, in order to achieve a four-sided borderless display device, a method of adding a filling material 193 to a gap between a color filter substrate 112 and an array substrate 111 of the display panel 11 is usually adopted, so that a side surface of the color filter substrate 112 is flush with a side surface of the array substrate 111. However, such means has defects such as chromatic aberration between the filled area and non-filled area, an uneven light-exiting surface of the display panel, and a poor appearance of the four-sided borderless display device. In view of this, embodiments of the present application provide a display panel and a display device, to improve flatness of a light-exiting surface of the display panel, and meanwhile, improve appearance effect of the display panel.

Figure 2:
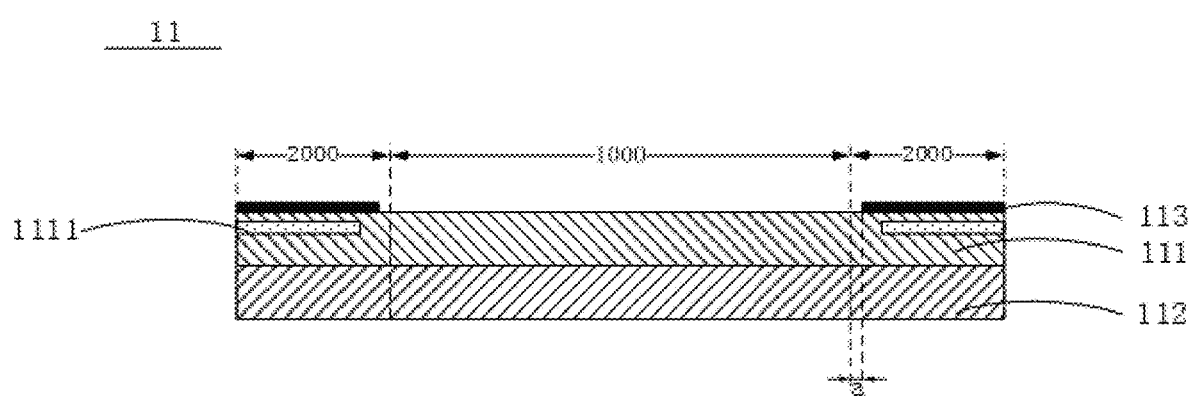
FIG. 2 is a schematic structural diagram of a display panel provided by an embodiment of the present application.
Figure 3:
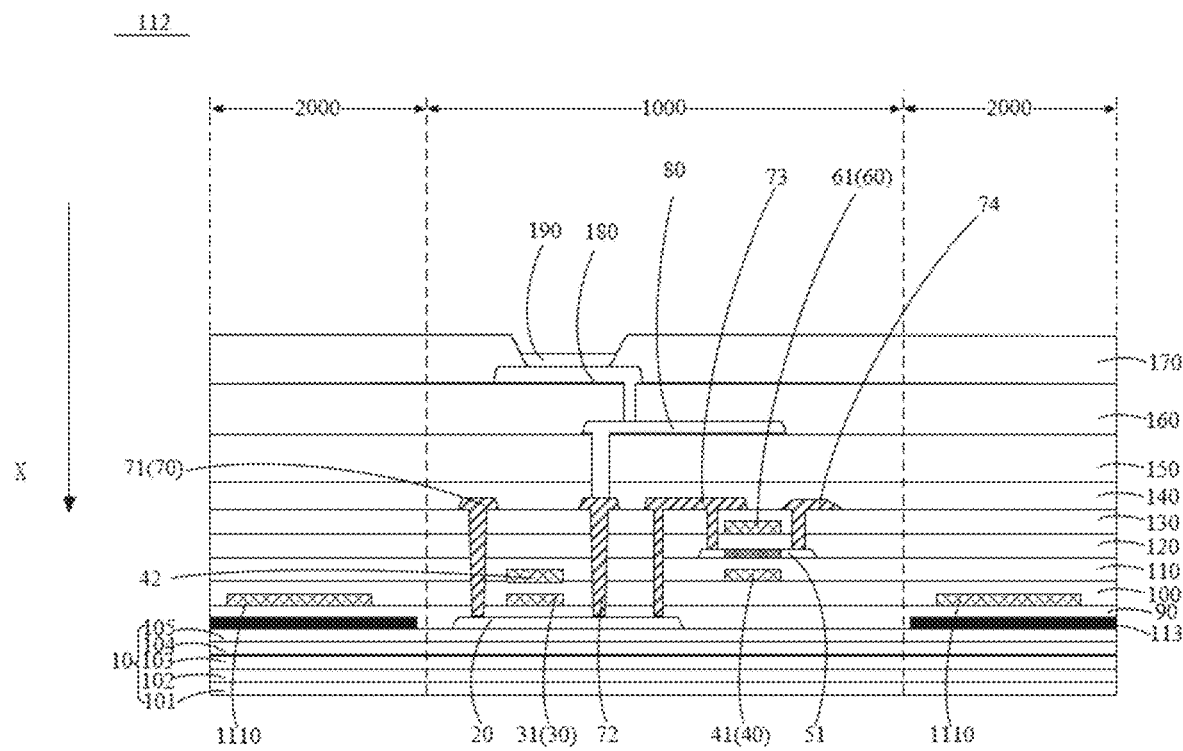
FIG. 3 is a schematic structural diagram of an array substrate provided by an embodiment of the present application.

Referring to FIG. 2 to FIG. 3, in an embodiment of the present application, the display panel 11 includes a first substrate 111 and a second substrate 112 disposed opposite to each other, and a liquid crystal layer (not shown) sandwiched between the first substrate 111 and the second substrate 112.

The display panel 11 includes a display area 1000 and a non-display area 2000 adjacent to the display area 1000, and the first substrate 111 includes a metal wiring 1111 located in the non-display area 2000.

The first substrate 111 includes a black shielding layer 113, and the black shielding layer 113 covers the metal wiring 1111 in an orthographic projection direction of the first substrate 111.

Specifically, in an embodiment of the present application, the first substrate 111 is an array substrate, and the second substrate 112 is a color filter substrate, wherein the first substrate 111 is located on a light-exiting side of the display panel 11, so the black shielding layer 113 is located on a side of the first substrate 111 away from the second substrate 112.

It is appreciated that the first substrate 111 being an array substrate, the second substrate 112 being a color filter substrate, and the black shielding layer 113 being located on the side of the first substrate 111 away from the second substrate 112 are for illustrative purposes only, and the present application is not specifically limited thereto.

It should be noted that, in an embodiment of the present application, the display panel may be an organic electroluminescent diode (OLED) display panel or a light-emitting diode (LED) display panel, and the present application is not specifically limited thereto.

In an embodiment of the present application, the first substrate 111 is located on the light-exiting side of the display panel 11, and an orthographic projection of the first substrate 111 on the second substrate 112 covers the second substrate 112, thereby improving flatness of the light-exiting surface of the display panel 11; meanwhile, the first substrate 111 includes a metal wiring 1111 located in the non-display area 2000. By disposing a black shielding layer 113 in the display panel 11, the black shielding layer 113 covers the metal wiring 1111 in the orthographic projection direction of the first substrate 111, thereby improving an appearance effect of the display panel 11.

The technical solution of the present application will now be described in conjunction with specific embodiments.

Referring to FIG. 2, FIG. 2 is a schematic structural diagram of a display panel provided by an embodiment of the present application.

In an embodiment of the present application, the display panel 11 includes a first substrate 111 and a second substrate 112 disposed opposite to each other, and a liquid crystal layer sandwiched between the first substrate 111 and the second substrate 112 (not shown).

The display panel 11 includes a display area 1000 and a non-display area 2000 adjacent to the display area 1000, and the first substrate 111 includes a metal wiring 1111 located in the non-display area 2000.

The first substrate 111 includes a black shielding layer 113, and the black shielding layer 113 covers the metal wiring 1111 in the orthographic projection direction of the first substrate 111.

Specifically, in an embodiment of the present application, the display panel 11 is an LED display panel, the first substrate 111 is an array substrate, and the second substrate 112 is a color filter substrate, wherein the first substrate 111 is located on the light-exiting side of the display panel 11, and the black shielding layer 113 is located on the side of the first substrate 111 away from the second substrate 112.

It is appreciated that the display panel 11 being an LED display panel, the first substrate 111 being an array substrate, and the second substrate 112 being a color filter substrate are for illustrative purposes only, and the present application is not specifically limited thereto.

In this embodiment, the black shielding layer 113 is located on the side of the first substrate 111 away from the second substrate 112. Specifically, the black shielding layer 113 is located in the non-display area 2000, and a distance from a side of the black shielding layer 113 close to the display area 1000 to the display area 1000 is 0.1 mm to 0.5 mm, and a thickness of the black shielding layer 113 is less than 0.5 micrometers.

It should be noted that in this embodiment, the distance from a side of the black shielding layer 113 close to the display area 1000 to the display area 1000 is not particularly limited. It is appreciated the black shielding layer 113 being located at the side of the first substrate 111 away from the second substrate 112 is for illustrative purposes only, and a position of the black shielding layer 113 is not specifically limited in the present application.

In this embodiment, the black shielding layer 113 includes but is not limited to black ink, wherein a material of the black ink includes a black pigment, a resin, a solvent and oil, a filler, and an auxiliary agent, wherein a content of the black pigment is 20% to 40%, a content of the resin is 15% to 25%, a content of the solvent and oil are 25% to 40%, and a content of the filler and auxiliary agent are 2% to 5%. It should be noted that the black shielding layer 113 may be prepared on the side of the first substrate 111 away from the second substrate 112 by a low-temperature screen printing process.

In this embodiment, by arranging the first substrate 111 on the light-exiting side of the display panel 11, the orthographic projection of the first substrate 111 on the second substrate 112 covers the second substrate 112, thereby improving the flatness of the light-exiting surface of the display panel 11. Meanwhile, the first substrate 111 includes the metal wiring 1111 located in the non-display area 2000, and since a metal wiring 1111 is disposed in the non-display area 2000 of the display panel 11, and the black shielding layer 113 covers the metal wiring 1111 in the orthographic projection direction of the first substrate 111, the appearance effect of the display panel 11 is thereby improved. In addition, a distance from a side of the black shielding layer 113 close to the display area 1000 to the display area 1000 ranges from 0.1 mm to 0.5 mm, so as to prevent problems of exposing the metal wiring 1111 by the black shielding layer 113 and shielding the display area 1000 by the black shielding layer 113.

It should be noted that in this embodiment, the first substrate 111 and the second substrate 112 are disposed opposite to each other, and the first substrate 111 is disposed on the light-exiting side of the display panel 11. In this embodiment, the black ink is printed on the first substrate 111 by a low-temperature screen printing process, thereby preparing the black shielding layer 113. In the prior art, the second substrate 112 is located on the light-emitting side of the display panel 11, and it is necessary to clamp a cross section with a mold first, and then fill the mold with liquid glue, then remove the mold, and then perform the glue curing. Compared with the prior art, this embodiment simplifies the manufacturing process steps and improves the manufacturing efficiency.

Referring to FIG. 3, FIG. 3 is a schematic structural diagram of a first substrate provided by an embodiment of the present application.

It should be noted that, in FIG. 3, the X direction is the light-exiting side of the display panel 11.

In this embodiment, the first substrate 111 includes a base substrate 10; and a first semiconductor layer 20, a first metal layer 30, a second metal layer 40, a second semiconductor layer 51, third metal layer 60, and the fourth metal layer 70 are formed on the base substrate 10, wherein the fourth metal layer 70 includes a first source 71, a first drain 72, a second source 73, and a second drain 74. The first source 71 and the first drain 72 are electrically connected to the first semiconductor layer 20, and the second source 73 and the second drain 74 are electrically connected to the second semiconductor layer 51.

The first metal layer 30 includes a first gate 31 located in the display area 1000, the second metal layer 40 includes a second gate 41 located in the display area 1000, and the third metal layer 60 includes a third gate 61 located in the display area 1000.

Specifically, in this embodiment, the first metal layer 30 further includes a first capacitor electrode (not shown), and the second metal layer 40 also includes a second capacitor electrode 42, wherein the third capacitor electrode and the fourth capacitor electrode 42 form a capacitor.

Referring to FIG. 2, in this embodiment, the first substrate 111 further includes a wiring layer 1110 located in the non-display area 2000, and the wiring layer 1110 is disposed on a side of the base substrate 10 close to the second substrate 112, the wiring layer 1110 includes a plurality of metal wirings 1111 located in the non-display area 2000. Specifically, the wiring layer 1110 and the first gate 31 are provided in the same layer, or the wiring layer 1110 and the second gate 41 are provided in the same layer, or the wiring layer 1110 and the third gate 61 are provided in the same layer. It should be noted that, in this embodiment, the wiring layer 1110 may be formed by patterning the first metal layer 30, the second metal layer 40, or the third metal layer 60.

Specifically, in this embodiment, the wiring layer 1110 and the first gate 31 are provided in the same layer. It is appreciated that the wiring layer 1110 and the first gate 31 being provided in the same layer is for illustrative purposes only, and the present application is not specifically limited thereto.

In this embodiment, the first substrate 111 further includes a first interlayer dielectric layer 110 located between the second metal layer 40 and the second semiconductor layer 51, a third insulating layer 120 located between the second semiconductor layer 51 and the third metal layer 60, and a second interlayer dielectric layer 130 located between the third metal layer 60 and the fourth metal layer 70.

Specifically, the display panel includes the base substrate 10, the first semiconductor layer 20, the first insulating layer 90, the first gate 31, the second insulating layer 100, the second gate 41, the first interlayer dielectric layer 110, the second semiconductor layer 51, the third insulating layer 120, the third gate 61, the second interlayer dielectric layer 130, the fourth metal layer 70, the passivation layer 140, the first planarization layer 150, and the fifth metal layer 80 stacked from bottom to top.

It should be noted that in this embodiment, the base substrate 10 may include a rigid substrate or a flexible substrate. When the base substrate 10 is a rigid substrate, the material may be metal or glass. When the base substrate 10 is a flexible substrate, its material may include at least one of acrylic resin, methacrylic resin, polyisoprene, vinyl resin, epoxy-based resin, polyurethane-based resin, cellulose resin, siloxane resin, polyimide-based resin, or polyamide-based resin. The present application does not particularly limit the material of the base substrate 10.

In this embodiment, a material of the first semiconductor layer 20 includes but is not limited to polysilicon, and a material of the second semiconductor 51 includes but is not limited to oxide. The first semiconductor layer 20 forms a polysilicon active layer of each low-temperature polysilicon transistor, the second semiconductor layer 51 forms an oxide active layer of each oxide transistor, and the first semiconductor layer 20 and the second semiconductor layer 51 are electrically connected to each other through the second source 73.

In this embodiment, materials of the first metal layer 30, the second metal layer 40, and the third metal layer 60 may include at least one metal of molybdenum (Mo), aluminum (Al), platinum (Pt), and palladium. (Pd), silver (Ag), magnesium (Mg), gold (Au), nickel (Ni), neodymium (Nd), iridium (Jr), chromium (Cr), calcium (Ca), titanium (Ti), tantalum (Ta), or tungsten (W).

In this embodiment, materials of the first gate insulating layer 90, the second gate insulating layer 100, and the third gate insulating layer 120 include but are not limited to silicon oxide; and materials of the first interlayer dielectric layer 110 and the second interlayer dielectric layer 130 include at least one of silicon nitride or silicon oxide.

In addition, the display panel may further include a first planarization layer 150, a second planarization layer 170, an anode 190, a pixel definition layer 180, and a light-emitting functional layer 200 located above the second source and drain layer 80.

In this embodiment, the black shielding layer 113 is disposed in the first substrate 111 and is located on a side of the wiring layer 1110 away from the second substrate 112.

In this embodiment, the base substrate 10 includes a first base 101, a spacer layer 102, a second base 103, a buffer layer 104, and a cover layer 105 stacked in sequence. The black shielding layer 113 is provided in the same layer as at least one of the first gate insulating layer 90, the first base 101, the spacer layer 102, the second base 103, the buffer layer 104, or the cover layer 105.

Specifically, in this embodiment, the black shielding layer 113 and the first gate insulating layer 90 are provided in the same layer, and the black shielding layer 113 covers the plurality of metal wirings 1111 in the orthographic projection direction of the first base 101.

It is appreciated that the arrangement of the black shielding layer 113 and the first gate insulating layer 90 in the same layer is only for illustration, which is not particularly limited in this embodiment.

In the present application, a black shielding layer 113 is provided in the first substrate 111, and the orthographic projection of the black shielding layer 113 on the first base 101 covers the plurality of metal wirings 1111, thereby improving the appearance effect of the display panel. Meanwhile, the black shielding layer 113 is provided in the same layer as at least one of the first gate insulating layer 90, the first base 101, the spacer layer 102, the second base 103, the buffer layer 104, or the cover layer 105, thereby simplifying the manufacturing process of the display panel.

Figure 4:
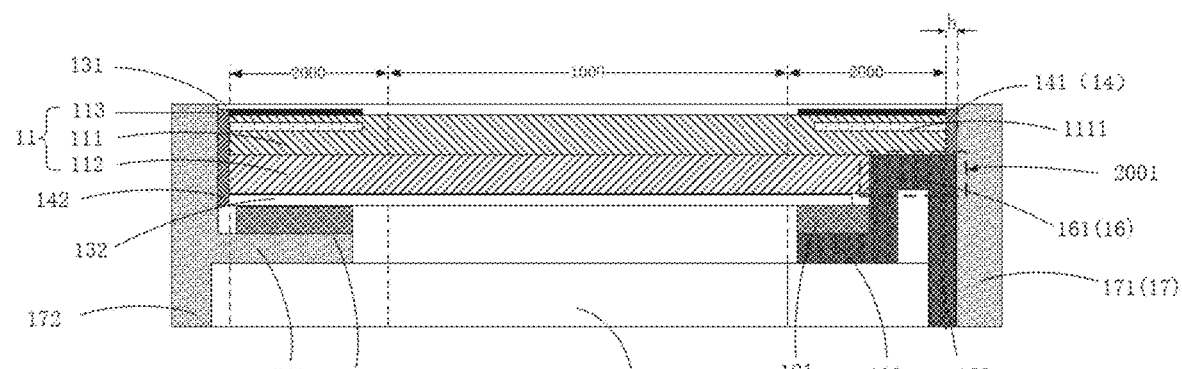
FIG. 4 is a schematic structural diagram of a display device provided by an embodiment of the present application.

Referring to FIG. 4, FIG. 4 is a schematic structural diagram of a display module provided by an embodiment of the present application.

An embodiment of the present application also provides a display module. The display device includes the display panel 11 as described above, and a middle frame 17 and a side sealant 14 located in the non-display area 2000 of the display panel 11.

The side sealant 14 is disposed at side surfaces of the black shielding layer 113, the first substrate 111, and the second substrate 112 facing the middle frame 17.

Specifically, in this embodiment, the display panel 11 is an LED display panel, the first substrate 111 is an array substrate, and the second substrate 112 is a color filter substrate. The first substrate 111 is located on the light-exiting side of the display panel 11, and the black shielding layer 113 is located on the side of the first substrate 111 away from the second substrate 112.

It is appreciated that the display panel 11 being an LED display panel, the first substrate 111 being an array substrate, the second substrate 112 being a color filter substrate, and the black shielding layer 113 being located on a side of the first substrate 111 away from the second substrate 112 are for illustrative purposes only, and the present application is not specifically limited thereto.

In this embodiment, the display module further includes a backlight module 12; wherein the backlight module 12 is located on a side of the second substrate 112 away from the first substrate 111.

In this embodiment, the display module further includes a first polarizer 131 located on a side of the first substrate 111 away from the second substrate 112, and a second polarizer 132 located on the second substrate 112 away from the first substrate 111. The first polarizer 131 completely covers the first substrate 111, the black shielding layer 113, and the side sealant 14. The side sealant 14 is respectively bonded to the display panel 11 and the first polarizer 131. A bonding width between the side sealant 14 and the first polarizer 131 is 0.2 mm to 0.5 mm. A projection of the second polarizer 132 on the second substrate 112 is located within the second substrate 112. In this embodiment, the side sealant 14 is provided, the side sealant 14 is black, and the side sealant 14 is respectively bonded the display panel 11 and the first polarizer 131 to prevent the first polarizer 131 from peeling off; and meanwhile, the two sides of the first polarizer 131 are prevented from transmitting light, which impacts the display effect.

In this embodiment, the non-display area 2000 includes a stepped sub-area 2001 located on a side of the display area 1000, and the second substrate 112 includes a hollow portion (not shown) located in the stepped sub-area 2001. The display module also includes a black frame 16 located in the non-display area 2000, the black frame 16 includes a first shielding portion 161 provided in the hollow portion and a second shielding portion 162 extending from an end of the first shielding portion 161 toward the display area, wherein the black shielding layer 113 covers the first shielding portion 161 and the second shielding portion 162 in the orthographic projection direction of the first substrate 111.

Specifically, the black frame 16 further includes a third shielding portion 163 bending and extending from an end of the first shielding portion 161 to a side of the backlight module 12, wherein the first shielding portion 161 covers the hollow portion in the orthographic projection direction of the first substrate 111.

The second shielding portion 162 is bonded to the second substrate 112 through a first double-sided adhesive 181; wherein the first double-sided adhesive 181 is black, and a side of the first double-sided adhesive 181 close to the black frame 16 is flush with a side of the second substrate 112 close to the black frame 16; and the black shielding layer 181 covers the first double-sided adhesive 181 in the orthographic projection direction of the first substrate 111.

In this embodiment, the black frame 16 is provided, the black frame 16 includes the first shielding portion 161 disposed in the hollow portion, and the first shielding portion 161 covers the hollow portion in the orthographic projection direction of the first substrate 111, so that the first substrate 111 is prevented from light leakage in the stepped sub-area 2001. Meanwhile, the black frame 16 further includes a third shielding portion 163 bending and extending from an end of the first shielding portion 161 to a side of the backlight module 12, so as to prevent light leakage from the side of the backlight module 12. In addition, the black frame 16 further includes a second shielding portion 162 extending from one end of the first shielding portion 161 to the display area. The second shielding portion 162 is connected to the second substrate 112 through the first double-sided adhesive 181 to play a role of supporting the display panel 11, and in the manufacturing process, the steps of manufacturing other functional components are also reduced. It is appreciated that the first double-sided adhesive 181 is black, and a side of the first double-sided adhesive 181 close to the black frame 16 is flush with a side of the second substrate 112 close to the black frame 16, so that the problem of light transmission in the non-display area 2000 is further prevented, thereby improving the display effect.

In this embodiment, the middle frame 17 includes a first frame 171 and a second frame 172 disposed at a periphery of the display panel 11 and the backlight module 12; the first frame 171 is disposed on a first side of the display panel 11, and the second frame 172 is disposed at least on a second side of the display panel 11. The first side and the second side are opposite sides of the display panel 11, and the first side is the side of the display panel 11 close to the black frame 16; wherein the second frame 172 includes an extension portion 1721 disposed between the display panel 11 and the backlight module 12, and the black shielding layer 113 covers the extension portion 1721 in the orthographic projection direction of the first substrate 111.

In this embodiment, the side sealant 14 includes a first side sealant 141 on a side of the black shielding layer 113, the first substrate 111, and the second substrate 112 facing the first frame 171, and a second side sealant 142 on a side of the black shielding layer 113, the first substrate 111, and the second substrate 112 facing the second frame 172, wherein the first side sealant 141 is respectively adhered to the display panel 11 and the first polarizer 131, and the second side sealant 142 is respectively adhered to the display panel 11, the first 12 polarizer 131 and the second polarizer 132.

In this embodiment, the extension portion 1721 is bonded to the second substrate 112 by a second double-sided adhesive 182; wherein the second double-sided adhesive 182 is black, and the black shielding layer 113 covers the second double-sided adhesive 182 in the orthographic projection direction of the first substrate 111. In this embodiment, the second middle frame 17 is provided, and the second frame 172 includes the extension portion 1721 extending between the display panel 11 and the backlight module 12, so as to play a role of supporting the display panel 11. Meanwhile, the extension portion 1721 is bonded to the second substrate 112 through the second double-sided adhesive 182; wherein the second double-sided adhesive 182 is black, so that the problem of light transmission in the non-display area 2000 is further prevented, thereby improving the display effect.

Another embodiment of the present application also provides a display device, which includes the display module in the foregoing embodiments or the display panel in the foregoing embodiments.

The display module and the display panel have been described in detail in the above embodiments, and details will not be repeated herein for brevity.

Referring to FIG. 5, FIG. 5 is a schematic block diagram of a flow chart of a method of manufacturing a display device according to an embodiment of the present application.

Yet another embodiment of the present application provides a method of manufacturing a display device. Referring to FIG. 2 in conjunction with FIG. 4, the manufacturing method includes the following steps:

Step S10: preparing a display panel 11.

The display panel 11 includes a display area 1000 and a non-display area 2000 adjacent to the display area 1000. The display panel 11 includes a first substrate 111 located on a light-exiting side of the display panel 11. The first substrate 111 includes a plurality of metal wirings 1111 located in the non-display area 2000. The second substrate 112 is disposed opposite to the first substrate 111. An orthographic projection of the first substrate 111 on the second substrate 112 covers the second substrate 112. The display panel 11 includes a black shielding layer 113 located in the non-display area 2000, and the black shielding layer 113 covers a plurality of metal wirings 1111 in an orthographic projection direction of the first substrate 111.

In this embodiment, the step S10 includes the following steps:

Step S11: providing a first substrate 111 and a second substrate 112, and aligning the first substrate 111 and the second substrate 112 to form a cell, wherein the first substrate 111 is located on a light-exiting side of the display panel 11.

Specifically, in this embodiment, the display panel 11 is an LED display panel, the first substrate 111 is an array substrate, and the second substrate 112 is a color filter substrate.

It is appreciated that the display panel 11 being an LED display panel, the first substrate 111 being an array substrate, and the second substrate 112 being a color filter substrate are for illustrative purposes only, and the present application is not specifically limited thereto.

Step S12: preparing a black shielding layer 113 on a side of the first substrate 111 away from the second substrate 112, wherein the black shielding layer 113 is located in the non-display area 2000, and the black shielding layer 113 completely covers the plurality of metal wirings 1111.

It should be noted that, in this embodiment, the black shielding layer 113 includes but is not limited to black ink, a method of preparing the black shielding layer 113 includes but is not limited to a low-temperature screen printing process, and a thickness of the black shielding layer 113 is less than 0.5 microns, wherein a temperature of the low-temperature screen printing process is less than 70 degrees Celsius.

In this embodiment, the black ink is printed on the first substrate 111 by a low-temperature screen printing process, thereby preparing the black shielding layer 113. In the prior art, the second substrate 112 is located on the light-emitting side of the display panel 11, and it is necessary to clamp a cross section with a mold first, and then fill the mold with liquid glue, then remove the mold, and then perform the glue curing. Compared with the prior art, this embodiment simplifies the manufacturing process steps and improves the manufacturing efficiency.

Further, in this embodiment, a distance a from a side of the black shielding layer 113 close to the display area 1000 to the display area 1000 ranges from 0.1 mm to 0.5 mm. By disposing a black shielding layer 113 in the non-display area 2000 of the display panel 11, wherein the orthographic projection of the black shielding layer 113 on the first substrate 111 covers the orthographic projection of the plurality of metal wirings 1111 on the first substrate, the appearance effect of the display panel 11 is thereby improved. In addition, a distance from a side of the black shielding layer 113 close to the display area 1000 to the display area 1000 ranges from 0.1 mm to 0.5 mm, so as to prevent problems of exposing the metal wiring 1111 by the black shielding layer 113 and shielding the display area 1000 by the black shielding layer 113.

Step S20: preparing a first polarizer 131 on the side of the first substrate 111 away from the second substrate 112, and preparing a second polarizer 132 on a side of the second substrate 112 away from the first substrate 111.

The first polarizer 131 completely covers the first substrate 111, and a projection of the second polarizer 132 on the second substrate 112 is located in the second substrate 112.

Step S30: preparing a side sealant 14 at a side of the display panel 11.

In this embodiment, by providing the side sealant 14, wherein the side sealant 14 is respectively bonded to the display panel 11 and the first polarizer 131, and a bonding width between the side sealant 14 and the first polarizer 131 is 0.2 mm to 0.5 mm, the first polarizer 131 is prevented from peeling off; and meanwhile, the two sides of the first polarizer 131 is prevented from transmitting light, which impacts the display effect.

Step S40: assembling the backlight module 12, the black frame 16, and the middle frame 17.

Step S50: assembling the display panel 11, the backlight module 12, the black frame 16, and the middle frame 17.

The backlight module 12, the black frame 16, and the middle frame 17 have been described in detail in the above display module, and details will not be repeated herein for brevity.

In specific applications, the display device may be the display screen of a smart phone, tablet computer, notebook computer, smart bracelet, smart watch, smart glasses, smart helmet, desktop computer, smart TV, or digital camera, and can even be applied to electronic devices with flexible display screens.

In summary, the present application discloses a display panel, a display module, and a display device. The display panel includes a first substrate and a second substrate arranged opposite to each other, and a liquid crystal layer sandwiched between the first substrate and the second substrate, wherein the display panel includes a display area and a non-display area adjacent to the display area, and the first substrate includes a metal wiring located in the non-display area; and wherein the first substrate includes a black shielding layer, and the black shielding layer covers the metal wiring in an orthographic projection direction of the first substrate, thereby improving appearance effect of the display panel.

In the above embodiments, the descriptions of each embodiment have their own emphasis. The parts that are not described in detail in an embodiment can be referred to the detailed descriptions in other embodiments above.

It is appreciated that for those of ordinary skill in the art, equivalent substitutions or changes can be made according to the technical solutions and inventive concepts of the present application, and all these changes or substitutions shall fall within the protection scope of the appended claims of the present application.

What is claimed is:

1. A display module, comprising a display panel, and the display panel comprising:
   a first substrate and a second substrate arranged opposite to each other, and a liquid crystal layer sandwiched between the first substrate and the second substrate, wherein the display panel comprises a display area and a non-display area adjacent to the display area, and the first substrate comprises a metal wiring located in the non-display area; the first substrate comprises a black shielding layer, and the black shielding layer covers the metal wiring in an orthographic projection direction of the first substrate;
   wherein the display module further comprises a middle frame and a side sealant located a side of the non-display area of the display panel away from the display area of the display panel, and the side sealant is disposed at side surfaces of the black shielding layer, the first substrate, and the second substrate facing the middle frame;
   wherein the non-display area comprises a stepped sub-area located at a side of the display area, and the second substrate comprises a hollow portion located in the stepped sub-area; the display module further comprises a black frame located in the non-display area, and the black frame comprises a first shielding portion disposed in the hollow portion and a second shielding portion extended from one end of the first shielding portion to the display area; the black shielding layer covers the first shielding portion and the second shielding portion in the orthographic projection direction of the first substrate;
   wherein the middle frame comprises a first frame and a second frame arranged at a periphery of the display panel; the first frame is disposed at a first side of the display panel, the second frame is disposed at least at a second side of the display panel, the first side and the second side are opposite sides of the display panel, and the first side is a side of the display panel close to the black frame; the second frame comprises an extension portion extending to a side of the second substrate away from the first substrate, and the black shielding layer covers the extension portion in the orthographic projection direction of the first substrate.

2. The display module according to claim 1, wherein the display module further comprises a polarizer disposed on a side of the first substrate away from the second substrate;
   wherein the polarizer completely covers the first substrate, the black shielding layer, and the side sealant; and
   wherein the side sealant is respectively bonded to the display panel and the polarizer, and a bonding width between the side sealant and the polarizer is 0.2 mm to 0.5 mm.

3. The display module according to claim 1, wherein the second shielding portion is bonded to the second substrate by a first double-sided adhesive; a side of the first double-sided adhesive close to the black frame is flush with a side of the second substrate close to the black frame; and the black shielding layer covers the first double-sided adhesive in the orthographic projection direction of the first substrate.

4. The display module according to claim 1, wherein the extension portion is bonded to the second substrate by a second double-sided adhesive; and the black shielding layer on the first substrate covers the second double-sided adhesive in the orthographic projection direction of the first substrate.

5. The display module according to claim 1, wherein the black shielding layer is located on a side of the first substrate away from the second substrate.

6. The display module according to claim 5, wherein the black shielding layer is located in the non-display area, and a distance from a side of the black shielding layer close to the display area to the display area is 0.1 mm to 0.5 mm.

7. The display module according to claim 1, wherein the first substrate comprises a base substrate and a wiring layer disposed on a side of the base substrate close to the second substrate, and the wiring layer comprises a plurality of the metal wirings located in the non-display area; and
   wherein the black shielding layer is disposed in the first substrate and located on a side of the wiring layer away from the second substrate.

8. The display panel according to claim 1, wherein the black shielding layer is made of black ink.

9. The display panel according to claim 1, wherein the black frame further comprises a third shielding portion bending and extending from an end of the first shielding portion to a side of a backlight module; a side edge of the third shielding portion close to the display area is in contact with at least a side edge of the backlight module, and a side edge of the third shielding portion away from the display area is in contact with the second frame.

10. The display panel according to claim 9, wherein a cavity is defined between the backlight module, the third shielding portion, the second shielding portion, and the first shielding portion.

11. The display panel according to claim 1, wherein the first substrate is an array substrate, and the second substrate is a color filter substrate.

12. A display device, comprising a display module, the display module comprising a display panel, and the display panel comprising:
   a first substrate and a second substrate arranged opposite to each other, and a liquid crystal layer sandwiched between the first substrate and the second substrate, wherein the display panel comprises a display area and a non-display area adjacent to the display area, and the first substrate comprises a metal wiring located in the non-display area;
   wherein the first substrate comprises a black shielding layer, and the black shielding layer covers the metal wiring in an orthographic projection direction of the first substrate; and
   wherein the display module further comprises a middle frame and a side sealant located a side of the non-display area of the display panel away from the display area of the display panel, and the side sealant is disposed at side surfaces of the black shielding layer, the first substrate, and the second substrate facing the middle frame;

wherein the non-display area comprises a stepped sub-area located at a side of the display area, and the second substrate comprises a hollow portion located in the stepped sub-area; the display module further comprises a black frame located in the non-display area, and the black frame comprises a first shielding portion disposed in the hollow portion and a second shielding portion extended from one end of the first shielding portion to the display area; the black shielding layer covers the first shielding portion and the second shielding portion in the orthographic projection direction of the first substrate;

wherein the middle frame comprises a first frame and a second frame arranged at a periphery of the display panel; the first frame is disposed at a first side of the display panel, the second frame is disposed at least at a second side of the display panel, the first side and the second side are opposite sides of the display panel, and the first side is a side of the display panel close to the black frame; the second frame comprises an extension portion extending to a side of the second substrate away from the first substrate, and the black shielding layer covers the extension portion in the orthographic projection direction of the first substrate.

13. The display device according to claim 12, wherein the black shielding layer is located on a side of the first substrate away from the second substrate.

14. The display device according to claim 13, wherein the black shielding layer is located in the non-display area, and a distance from a side of the black shielding layer close to the display area to the display area is 0.1 mm to 0.5 mm.

15. The display device according to claim 12, wherein the first substrate comprises a base substrate and a wiring layer disposed on a side of the base substrate close to the second substrate, and the wiring layer comprises a plurality of the metal wirings located in the non-display area;

wherein the black shielding layer is disposed in the first substrate and located on a side of the wiring layer away from the second substrate.

16. The display device according to claim 12, wherein the black shielding layer is made of black ink.

17. The display device according to claim 12, wherein the display module further comprises a polarizer disposed on a side of the first substrate away from the second substrate;

wherein the polarizer completely covers the first substrate, the black shielding layer, and the side sealant; and wherein the side sealant is respectively bonded to the display panel and the polarizer, and a bonding width between the side sealant and the polarizer is 0.2 mm to 0.5 mm.

18. The display device according to claim 12, wherein the second shielding portion is bonded to the second substrate by a first double-sided adhesive; a side of the first double-sided adhesive close to the black frame is flush with a side of the second substrate close to the black frame, and the black shielding layer covers the first double-sided adhesive in the orthographic projection direction of the first substrate.

19. The display device according to claim 12, wherein the black frame further comprises a third shielding portion bending and extending from an end of the first shielding portion to a side of a backlight module; a side edge of the third shielding portion close to the display area is in contact with at least a side edge of the backlight module, and a side edge of the third shielding portion away from the display area is in contact with the second frame.

20. The display device according to claim 19, wherein a cavity is defined between the backlight module, the third shielding portion, the second shielding portion, and the first shielding portion.

* * * * *